March 18, 1941.  R. L. WOMER ET AL  2,235,188
CHRONOSCOPIC METHOD AND APPARATUS
Filed Aug. 26, 1937    4 Sheets-Sheet 1

INVENTORS
ROBERT L. WOMER AND EDWIN F. FLORMAN.
BY Jos. Fleischer
THEIR ATTORNEY INVENTORS
ROBERT L. WOMER AND EDWIN F. FLORMAN
BY Jos. Flercher
THEIR ATTORNEY Patented Mar. 18, 1941

2,235,188

UNITED STATES PATENT OFFICE 2,235,188

CHRONOSCOPIC METHOD AND APPARATUS

Robert L. Womer, Alton, and Edwin F. Florman, Wood River, Ill., assignors to Western Cartridge Company, East Alton, Ill., a corporation of Delaware Application August 26, 1937, Serial No. 161,074

8 Claims. (Cl. 161—18)

This invention relates to the accurate measurement of the duration of intervals of time, and more particularly to a method and apparatus which may be readily adapted to the determination of the absolute magnitude of exceedingly small values thereof, such as occur in connection with the functioning of ammunition and explosives.

An object of this invention is to provide a chronoscopic method and apparatus free from systematic errors and instrumental variations and the absolute accuracy of which can be readily controlled and maintained.

Another object is to provide an improved method and apparatus whereby the absolute duration of time intervals may be measured directly with accuracy.

A further object is to supply readily reproducible means for the calibration of electrical chronoscopic apparatus in terms of absolute time magnitudes.

Another object is to provide a chronoscopic method and apparatus adapted for the direct measurement of absolute time intervals involved in the action of explosives.

A further object is to provide a method and apparatus for the direct and accurate measurement of the velocity of a projectile.

Another object is to provide a method and apparatus for the measurement of ignition time, barrel time, and muzzle velocity of ammunition.

Another object is to provide a method and apparatus which is readily adapted to the accurate control testing of ammunition, such as shot shells and loaded rifle cartridges.

Further objects will appear from the following detailed description and the accompanying drawings, in which.

In accordance with the present invention, generally stated, the absolute duration of an interval of time is measured directly by associating the initial point of the said time interval with the simultaneous interruption of an electrical conductor, then interrupting a second conductor coincidentally with the terminal point of the said time interval, and by means of a suitable electrical circuit arranging these interruptions to cause the passage of a charge of electricity, the magnitude of which depends on the elapsed time between the interruptions, through an electrical charge measuring instrument which is calibrated in terms of absolute time units. The calibration is accomplished by taking readings when pairs of conductors, attached in the circuit, are interrupted successively with the intervention of time intervals of known absolute values.

Electrical circuits suitable for use in accordance with this invention must meet the requirements (1) of being adapted to be operated by the successive interruption of a pair of electrical conductors, (2) of being adapted, on the occurrence of the aforesaid interruptions, to pass through an electrical charge measuring device an amount of electricity which depends on the extent of the period intervening between the interruptions, and (3) of containing a small enough number of components to insure simplicity and constancy of operation. A circuit of this type may, for example, comprise a battery of constant voltage connected in series with a suitable resistance and two conductors adapted to be interrupted, of which the one first to be interrupted has attached to its terminals a parallel circuit containing an electric charge measuring instrument, such as a ballistic galvanometer, and in series with the same an electrical resistance, inductance, or capacity. With any of these and other suitable arrangements of the same components, the successive interruption of the conductors causes the passage through the galvanometer of an amount of electrical charge which depends on the duration of the intervening period. Since the operating circuit involves only two components, in addition to the source of electromotive force, desirable features of simplicity and ruggedness are provided which are not available with circuits composed of a larger number of elements.

Figure 1:
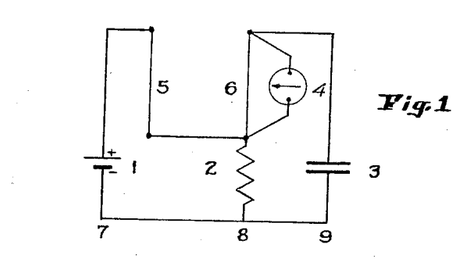
Figure 1 is a diagram representing an elemental form of electrical circuit which may be utilized in apparatus embodying this invention.

Increased advantage is generally obtainable with the use of apparatus based on the partial discharge of an electrical condenser, since the portion of the circuit in operation during the time interval may in this case be composed of only two elements, a condenser and a resistance. A detailed description will therefore be given of this preferred type, a suitable electrical circuit for which is illustrated in Figure 1. The numeral 1 represents a constant electromotive force, 2 is a constant resistance, 3 is a condenser of constant capacity, 4 is a ballistic galvanometer, and 5 and 6 represent the conductors to be interrupted, which may, for example, consist of frangible conducting wires. The connections are preferably made as shown, with the conductor 5, which is the one first to be interrupted, attached in series with the resistance 2 and the source of electromotive force 1, and with the condenser 3 and the second conductor 6 connected in series across the terminals of the resistance 2, the galvanometer 4 being attached to the terminals of conductor 6. The electrical resistance of the external circuit shown in the diagram is negligible compared with that of resistance 2, and the resistance of the portion 6 is low compared with that of the galvanometer 4. In operation, the circuit may be grounded at points 7, 8, and 9.

If a potential difference of E volts exists across the terminals of resistance 2, an electrical charge of EC coulombs will be acquired by condenser 3, C representing its capacity expressed in farads. If the condenser is then permitted to discharge through resistance 2, as by interrupting conductor 5, the residual charge on the condenser after a time of discharge $t$ is given by the following equation, provided that the circuit is substantially induction-free, $$q = q_0 e^{-t/RC}$$

where
$q$ = residual charge on condenser after time $t$ in coulombs
$q_0$ = EC = initial charge on the condenser in coulombs
$e$ = base of Naperian logarithms (2.71828)
$t$ = time of discharge in seconds
$R$ = resistance of discharge circuit in ohms
$C$ = capacity of condenser in farads.

If the circuit is connected as shown in Figure 1 so that the condenser 3 is fully charged and then the circuits through 5 and 6 are interrupted successively, the interruptions corresponding respectively to the beginning and end of an interval of time, the condenser will discharge through resistance 2 by way of conductor 6 during the particular time interval, and at the terminal point of the same, on the interruption of conductor 6, the residual charge on the condenser will pass through the galvanometer 4 and cause a deflection thereof. The extent of the deflection depends on the amount of charge passing through the galvanometer, and that in turn is governed by the length of time intervening between the interruptions of conductors 5 and 6. By reading the deflections produced when the interruptions are spaced known intervals of time apart, the galvanometer scale is calibrated in terms of absolute time units, and the duration of an unknown time interval can then be obtained directly by reading the corresponding galvanometer deflection.

In prior attempts to apply the principles of electric condenser discharge to the measurement of time intervals, it was essential that the values of the capacity of the condenser and of the resistance be known and that both the initial charge $q_0$ and the residual charge $q$ of the condenser be determined in order that the time might be calculated by means of the equation given above. The apparatus heretofore in use therefore involved an auxiliary galvanometer circuit through which the charge on the condenser could be passed by the manipulation of a switch. This procedure for making a measurement was not only tedious but also possessed the more serious disadvantage of yielding results which could not be relied on as representing absolute values. This consequence arose mainly because of electrical leakage in the circuit and the fact that the initial and residual charges were isolated on the condenser for varying periods of time before being passed through the galvanometer. We have found that an isolated partly discharged condenser may either lose charge on standing, because of electrical leakage, or at times even acquire additional charge, presumably due to the passage of electricity from the dielectric which had previously been saturated at a higher potential to the partly discharged condenser plates. Additional errors in the calculated time values could result from temperature fluctuations of the condenser due to variations in capacity produced thereby.

In accordance with the principles of this invention as applied to condenser discharge apparatus, need for the knowledge of the values of C, R, and $q_0$ is eliminated by calibrating the galvanometer deflections caused by residual charges on the condenser in terms of absolute time magnitudes. This calibration is carried out by means of apparatus, for example, of the type described in detail hereinafter, in which two conductors which are substituted for 5 and 6 of Figure 1 are successively interrupted with the intervention of time intervals of known absolute values. Furthermore, instrumental errors which were hitherto unavoidable have been eliminated by arranging the circuit so that on the interruption of conductor 6, the residual charge on the condenser discharges through the galvanometer. Thus, the measurement of an unknown time interval may be made with certainty and without involving any calculations merely by reading the corresponding galvanometer deflection. The accuracy of the measurements may be substantiated rapidly whenever desired by repeating one or more calibration readings.

The following essential precautions must be observed in the determinations—(1) The potential E applied across the condenser 3 (i. e. across the terminals of resistance 2) must be held at a constant value. In practice, this is readily attained by the periodic checking of this voltage drop in terms of galvanometer deflections and making adjustments of the same to the desired value whenever necessary. (2) The capacity of the condenser must remain at a constant value. Since most electrical condensers, such as mica condensers, have a temperature coefficient of capacity, errors in the absolute time values result from temperature fluctuations of the condenser. The possibility of errors from this source is obviated by maintaining the condenser at constant temperature. (3) A minimum charging time is required to insure that the condenser is charged to its full capacity for each measurement. (4) The various parts of the circuit must be well insulated for optimum operation of the apparatus. However, one of the main deficiencies of prior methods and apparatus, the dependence of the accuracy of the measurements on the complete absence of even minor insulation deficiencies, has been eliminated in the method and apparatus of the present invention. Heretofore, the existence of such errors could be found only through extensive and laborious calibration experiments involving the measurement of one or more time intervals by means of several independent time-measuring instruments, for example, as described on pages 133-139 of "Lehrbuch der Ballistik" (2nd ed.), vol. 3 by C. Cranz. This procedure served to establish the unilateral error of the condenser-discharge apparatus in its particular state at the time; there could be no assurance however that this amount of error would be maintained for any length of time with a sufficient degree of constancy for accurate measurements. Thus, considerable uncertainty was always bound to exist with regard to the absolute accuracy of the time values which were obtained by means of the electric condenser discharge apparatus and procedure heretofore in use. If excessive errors were found to exist, their cause, particularly if it resided in faulty insulation, was extremely difficult to locate and correct. In accordance with the present invention, the identical measuring circuit and procedure are utilized both in the measurement of the unknown time intervals and in the calibration, and therefore since minor defects due to faulty insulation have the same effect in both cases, they become cancelled and do not impair the accuracy of the measurements.

A further aspect of the present invention involves the choice of the values of the various components of the circuit in such fashion that obtainment of measurements is facilitated. From the basic equation $$q = q_0 e^{-t/RC} = CE e^{-t/RC}$$

or $$t = RC \log_e \frac{q_0}{q} = RC \log_e \frac{CE}{q}$$

it can readily be shown that if the galvanometer deflections caused by residual charges on the condenser are calibrated in terms of absolute time magnitudes for a particular set of values of the circuit components, E, C, and R, then it is possible to substitute other values of R in the circuit by changing the value of resistance 2, and obtain the calibration curve for the new setting merely by multiplying the original values by the ratio of the new resistance to the original. This enables the extension of the time intervals which can conveniently be measured by the apparatus directly with fixed values for E and C, considerably beyond the range available for calibration. For this purpose, it has been found convenient in practice to arrange the resistance 2 so that it can be set at any one of a series of resistances which bear a simple arithmetical ratio to one another, though their absolute values need not necessarily be known accurately.

In practice, the values of the circuit components are usually chosen within the following limits:

E ____________________________ volts__ 1.0–100
C ____________________________ microfarads__ 0.02–5.0
R ____________________________ ohms__ 100–100,000 although values outside these limits may at times be convenient. The stated lower limit for capacity is such that it is readily possible to have the distributed capacity of the external circuit negligible in comparison. Likewise, the given lower limit of the resistance is chosen so that the inductance of the entire circuit and the resistance of the external circuit can have no appreciable effect on the accuracy of the measurements. The shortest time interval which appears measurable with accuracy by the present procedure, using values of the circuit constants within those listed above, is limited by the sensitivity of the galvanometer and is of the order of $2 \times 10^{-8}$ seconds for a galvanometer having a sensitivity of $2 \times 10^{-9}$ coulombs per mm. The longest time interval which may be accurately measured with components within the above limits is of the order of five seconds.

It is generally preferable to choose a value of E within a range that offers freedom from possibilities of shock, that is, between 1 and 30 volts. A condenser convenient for use is one having a capacity somewhat less than the quotient of the maximum charge which may be measured by the galvanometer and the potential drop which has been chosen. The resistance, in turn, is chosen according to the time interval which is to be measured, so that a suitable galvanometer deflection is obtained, preferably within the upper two thirds of the scale.

Values of the circuit constants which have been found convenient for the measurement of time intervals between 0.0001 and 0.008 second are as follows: E—about 3.5 volts, C—1.0 microfarad and R—200, 400, 800, 1600, or 3200 ohms. The resistances listed are respectively adapted for the measurement of the following time intervals: 0.1–0.5, 0.2–1.0, 0.4–2.0, 0.80–4.0, and 1.6–8.0 milliseconds. Calibration experiments are essential, however, at only one setting of the resistance, for example, at 400 ohms. Additional flexibility and increased range of application may be provided by supplying the apparatus with an adjustable condenser and adjustable source of potential. Calibration experiments are then required for each particular joint setting of E and C in conjunction with a single value of R and calibration curves can then be calculated for other values of R in the circuit.

A further refinement which leads to improved facility of operation has been developed in utilizing the chronoscope of this invention for the measurement of projectile velocities. For this purpose, the frangible conducting wires 5 and 6 are set a definite distance, for example, four feet, apart in the path of the projectile so as to be successively severed by the latter, and the velocity may be determined by measuring the time required for the traversing of this distance. Since the velocity is given by the equation $$v = s/t$$

where $v$=velocity in feet per second
$s$=distance between conductors 5 and 6 in feet
$t$=time in seconds the basic equation describing the condenser discharge can be rewritten as follows:

$$q = CEe^{\frac{-s}{RC} \cdot \frac{1}{v}}$$

When values of $q$ calculated by this equation, assuming C, E, R, and s constant, are plotted against $v$, an S-shaped curve is obtained which is substantially linear over a fairly wide range. Differentiation gives the following equations for the first and second derivatives:

$$\frac{dq}{dv} = \frac{Es}{R} \cdot \frac{1}{v^2} e^{\frac{-s}{RC} \cdot \frac{1}{v}}$$

$$\frac{d^2q}{dv^2} = \frac{Es}{R} \cdot \frac{1}{v^3} e^{\frac{-s}{RC} \cdot \frac{1}{v}} \left(\frac{s}{RC} \cdot \frac{1}{v} - 2\right)$$

Since at the point of inflection of the $q$ versus $v$ curve, $$\frac{d^2q}{dv^2} = 0$$

the approximate mid-point of the nearly linear part may be calculated for a given setting of the circuit constants by solving the equation:

$$v = \frac{1}{2} \cdot \frac{s}{RC}$$

Substituting this value of $v$ in the original equation above, it becomes $q = CEe^{-2}$. Thus, with C and E fixed for the circuit, the graph of corresponding values of $q$ and $v$ for any values of $s$ and R will give a family of S-shaped curves, each of which has a point of inflection at the same value of $q$, that is $CEe^{-2}$. Each curve has a substantially linear portion, corresponding to the equation $$q = CEe^{-2}\left(\frac{4RC}{s}v - 1\right)$$

If the linear portion of one such curve is found to lie between two values $q_1$ and $q_2$, all other curves obtained with the same C and E for the circuit will likewise be approximately linear between the values $q_1$ and $q_2$. Also the ratio of the highest to the lowest velocity over the linear range and has the same value for all the curves. Furthermore, since $$v = \frac{s}{RC} \log_e \frac{q}{CE}$$

the calibration curve obtained for a particular set of values for $s$, R, C, and E may be made to apply to measurements obtained with other values of R and $s$ and the same setting of C and E, by a simple calculation. The galvanometer scale deflection may be substituted for the residual charge $q$ in the above equations when a moving coil galvanometer is used for which the scale deflection produced is directly proportional to the amount of charge.

For the direct obtainment of projectile velocity measurements, it has been found convenient to adopt standard values of $s$, C, and E and a series of values for R, which are in simple arithmetic ratio to one another. For example, the following values have been found convenient for velocity measurements of small arms projectiles by means of the apparatus described in detail hereinafter: $s = 4.0$ feet, $C = 1$ microfarad, $E =$ about 8 volts, and $R = 200, 400, 800, 1600,$ and $3200$ ohms. With the above values and 1600 ohms for the resistance, the galvanometer scale readings were calibrated directly in terms of velocity, and a linear relationship, within experimental error, between velocity and galvanometer deflections was found to exist between velocities of 800–1700 feet/second. The mid-point of the straight line portion is shown by substituting in the equation $$v = \frac{1}{2} \frac{s}{RC}$$

to be at a velocity of 1250 feet per second. The range of the instrument could be extended beyond the values used for calibration by substituting any of the other resistances for the 1600 ohms and multiplying the velocity reading by the ratio of 1600 ohms to the new resistance. The following table lists the resistance adapted for the determination of a velocity within the indicated range, over a linear portion of the curve. Once the limits of linearity are known, a calibration curve may be prepared by determining the galvanometer deflection corresponding to two velocities within these limits.

| R-ohms | Velocity |
| --- | --- |
|  | Feet/second |
| 3200 | 400–850 |
| 1600 | 800–1700 |
| 800 | 1600–3400 |
| 400 | 3200–6800 |
| 200 | 6400–13,600 |

The range of projectile velocities which may be measured by means of the above apparatus depends on the range of time intervals listed above which can be accurately determined, extended by the added feature of flexibility which is offered in varying the value of $s$. This latter distance should preferably be short enough in the case of muzzle velocity measurements so that appreciable changes in the velocity of the projectile do not occur within its limits and large enough so as to be readily capable of measurement with high percentage accuracy. Since the muzzle velocity of most small arms ammunition is within the range of 500 to 4500 feet per second, a convenient range of time intervals for measurement, 0.9 to 8 milliseconds, is provided by having $s = 4.0$ feet. However, other spacings may at times be advantageous. In general, relatively short distances of the order of 2–6 feet will be useful in direct measurements of the velocity of a projectile at definite points in its trajectory, while long spacings, for example, of the order of 120 feet or more, may be used in determining average velocities over such distances.

Figure 2:
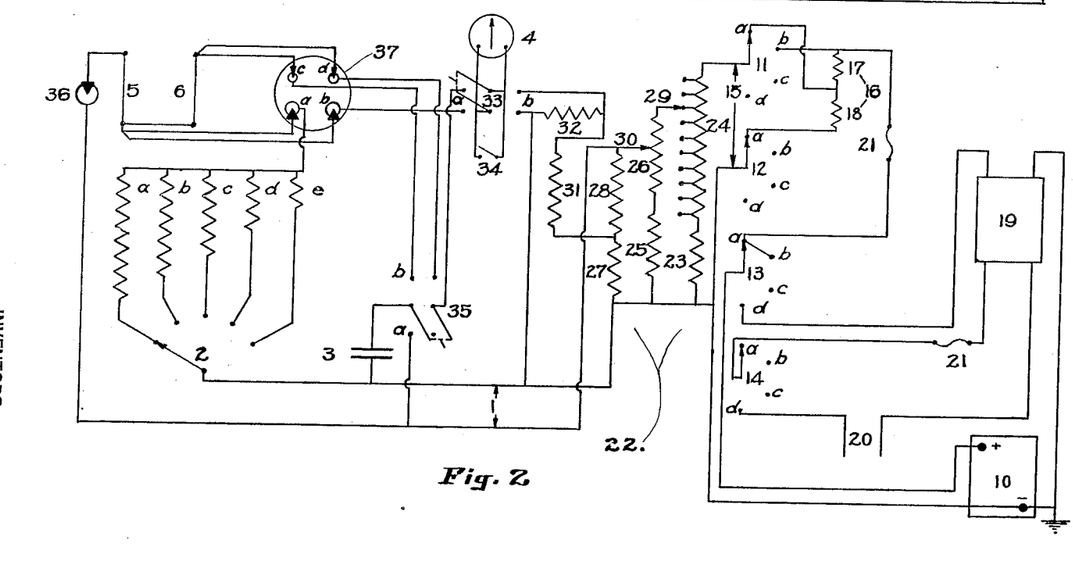
Figure 2 is a detailed diagram of the electrical circuit of a preferred form of chronoscopic apparatus embodying the principles of this invention.

The electrical circuit of a preferred form of chronoscope utilizing the principles of this invention is diagrammatically represented in Figure 2. The basic time-measuring circuit consists of the constant electrical potential 1, resistance 2, condenser 3, galvanometer 4, and interruptable conductors 5 and 6.

The constant potential 1 is derived from battery 10, which may, for example, consist of a four-cell storage battery having an electromotive force of about 8.4 volts. The battery circuit may be connected as desired by means of multiple-contact switches 11, 12, 13, and 14, which for convenience may be arranged as a four-deck switch mounted on a single shaft. Four settings $a$, $b$, $c$, and $d$ of the switches are shown, but more may be provided if necessary. Settings $a$ and $b$ of the switches enable the provision of approximately one-half and the entire battery voltage respectively across the circuit at 15 by appropriate connection of resistance 16 in the circuit; resistance 16, as shown, comprises two equal resistances 17 and 18, for example, of 20 ohms each. Additional resistances and appropriate connections and switch settings may be provided to permit the application of any desired fraction of the battery voltage across the circuit at 15 according to the time interval which is to be measured. The setting c of switches 11, 12, 13, and 14 represents the open position, while d provides for the charging of battery 10 by means of charger 19, which in turn is connected across a 110 volt A. C. line 20. Fuses 21 are provided for the protection of the various circuits and instruments. A double potentiometric circuit is provided as shown at 22 to enable the accurate adjustment of the voltage supplied at 15 to a desired constant potential drop at 1. This circuit consists of resistances 23, 24, 25, 26, 27, and 28 connected as illustrated, for which the following values have been found convenient: 23 consists of a 35 ohm resistance, 24 comprises a series of ten resistances of .225 ohm each and is provided with an adjustable contact 29, 25 is a 100 ohm resistance, and 26 is a one ohm resistance provided with adjustable contact 30. The circuit by means of which the potential drop at 1 is measured by galvanometer 4 comprises resistances 27, 28, 31, and 32, convenient values of which are 25; 5,000; 100,000; and 10,000 ohms respectively. The manner in which these circuits are utilized for the regulation and control of the potential drop applied across condenser 3 is described in detail hereinafter.

The galvanometer 4 is preferably of the ballistic type, having satisfactory sensitivity, for example, $2 \times 10^{-9}$ coulombs per mm. and a sufficiently long period to enable the ready reading of the maximum deflection; a period of twenty-eight seconds, for example, has been found suitable. This type of instrument is characterized by a movable coil having a large moment of inertia, and gives a measure of the total quantity of electricity passing through it by the maximum rotation of the coil which is produced thereby. This latter is read on a scale as the maximum deflection of a light beam reflected from a mirror mounted on the galvanometer coil. Generally, a direct proportionality exists between the amount of electrical charge and the maximum scale deflection produced. The instrument is preferably mounted so as to be free from vibration, for example, on a concrete pedestal set in the ground. The galvanometer scale and other accessories, such as the lamp and lens system for the provision of the necessary light beam, may likewise be mounted on the same concrete support.

Condenser 3 may be of any suitable construction having desired constant capacity and well insulated plates. It may at times be convenient to use a condenser of adjustable capacity or a set of condensers of different capacities. A good mica condenser, having a capacity of one microfarad and displaying only a slight absorption effect, which is maintained at $43.0° \pm 0.1°$ C., has been found suitable for use.

Resistance 2 comprises a set of resistances, any one of which may be placed in the circuit by means of an appropriate selector switch. The resistances are preferably stable and not subject to appreciable temperature effects. It is essential that their relative values be known accurately, and it is preferable that they be in simple numerical ratio with one another. A convenient set is represented by 2a, 2b, 2c, 2d, and 2e which correspond to resistances of 3200, 1600, 800, 400, and 200 ohms respectively.

Plug receptacles 36 and 37 are provided for the ready connection and substitution in the time-measuring circuit of conductors 5 and 6. One set of suitable plugs, adapted for insertion in receptacles 36 and 37, is provided for attaching the conductors of the calibrating device and one or more sets for the attachment of conductors for time or velocity measurements. As shown in the diagram, 36 is adapted for the insertion of a single wire, while 37 is a polarized four-way receptacle in which a corresponding plug can be inserted in only one way. Connections are always made so that 36 is connected with the free end of the conductor 5 which is to be interrupted first, 37a and 37b are connected with the common terminals of 5 and 6, and 37c and 37d are joined electrically with the free terminal of conductor 6, which is the last to be interrupted.

A two-pole switch is represented by 33, which may be placed in contact with points 33a or 33b, these settings serving for the measurement by means of the galvanometer 4 of the residual charge of the condenser 3 and the initial potential drop across the same, respectively. Numeral 34 represents a damping switch which when closed serves to bring the galvanometer coil to rest, and when open, permits the coil to rotate freely. It is normally retained in the damping position by a spring. Numeral 35 represents a two-pole switch which may be placed in contact with points 35a and 35b, and constitutes an operating convenience the utility of which is described in detail hereinafter.

Figure 3:
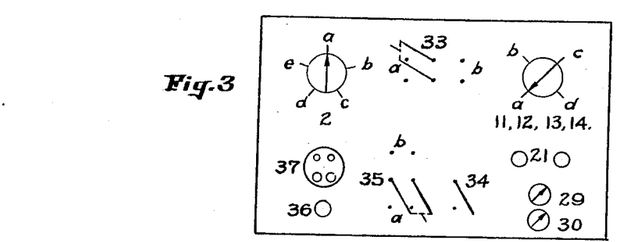
Figure 3 is a plan view of a convenient control panel for the circuit illustrated in Figure 2.

In one form of apparatus which has been found suitable, the battery 10, charger 19, and the constant-temperature cabinet containing the condenser 3, are conveniently housed in a desk cabinet, while the switches and controls are arranged on a panel readily accessible to the operator taking the galvanometer scale readings. A suitable arrangement of the control panel is illustrated in Figure 3. Switches 34 and 35 are conveniently arranged so that the operator may manipulate them with one hand.

Figure 4:
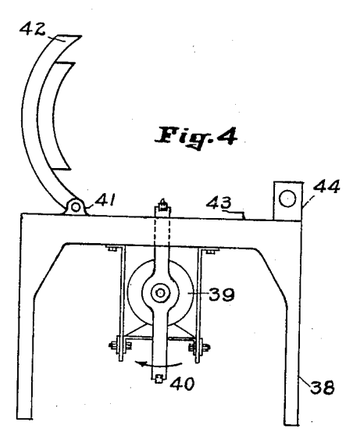
Figure 4 is a front elevation of apparatus suitable for the calibration of an electrical chronoscope directly in terms of absolute time values.
Figure 5:
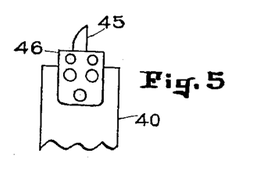
Figure 5 is a fragmentary view showing the mounting of the cutting blade of the apparatus illustrated in Figure 4.

The calibrating device of the present invention consists of apparatus by means of which two electrical conductors, furnished with connections so as to be insertable as conductors 5 and 6 of Figure 2, may be successively interrupted with the intervention of any of a series of known time intervals. This may be accomplished, for example, by severing a pair of fragile conductors, such as fine wires or thin metal foils, spaced a known distance apart by means of an insulated cutting blade moving at a known velocity, as by means of a blade attached to a falling weight. Similarly, other means of opening electrical circuits may be employed. Suitable apparatus must meet the requirements that a series of time intervals of known absolute values are provided and that the time required for the actual interruptions of the conductors be negligible in comparison with the calibration period. As pointed out above, the use of a set of resistances of accurately known relative values allows the calibration of the apparatus to be carried out with the use of known time intervals which are beyond the range of those to be measured. One form of calibration apparatus which has been found preferable for practical use is diagrammatically illustrated in Figures 4, 5, and 6. Referring to Figure 4, the equipment is shown mounted on a heavy iron table 38. A one-fourth H. P., 60 cycle, synchronous motor 39, revolving at the rate of 1800 R. P. M. is suitably suspended underneath the table by means of rigid supports. Blade 40, made of duraluminum, revolving in the direction indicated by the arrow, is rigidly attached to the motor shaft, and projects slightly above the table top through a slit provided for the purpose. Numeral 41 represents a fitting, attached to the table top at one end of the slit, on which the timer-wire rack 42 is pivotally mounted, while 43, placed at the other end of the slit, is a spring for supporting the said rack. A frequency meter, for accurately measuring the A. C. frequency supplied to the motor 39, is represented at 44. A steel cutting blade 45 is fastened to one end of blade 40 by means of two plates 46, one on each face of blade 40, as shown in front view in Figure 5, the cutting blade 45 being electrically insulated from plates 46 by means of interposed sheets of mica. Plates similar to 46 are likewise fastened to the other end of blade 40 so that the latter is accurately balanced.

Figure 6:
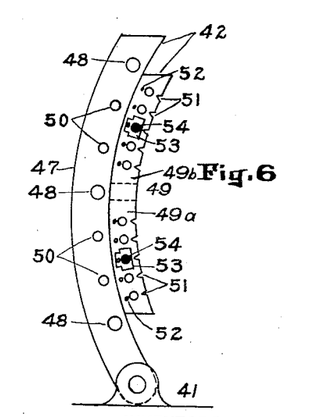
Figure 6 is a front elevation of the timer-wire rack of the calibration apparatus illustrated in Figure 4, showing the construction of the same in detail.

Figure 6 is a front view in detail of rack 42. Two arcuate plates 47, for example, of suitable molded insulating composition, one of which appears in the diagram, are fastened together by means of brass nuts 48 with interposed spacers, not shown, and are pivotally fastened to the table top at 41. An arcuate brass plate 49 is fastened to each of the plates 47 by means of brass screws 50, one of the plates 49 being integral and the other, not shown, being divided into two sections 49a and 49b, indicated by the dotted lines, which are electrically insulated from one another. Each brass plate 49 is provided with two sets of accurately spaced notches 51, so arranged that wires fastened between corresponding notches of the said two plates will lie in the path of cutting blade 45 when the rack is placed in operating position. Sets of two pins 52, one of which is threaded, are provided as shown for fastening and making electrical connections with the wires to be cut. Connections are made by means of brass plates 53, provided with openings corresponding to pins 52, by tightening the knobs 54 which are fitted with suitable interior threads. Permanent electric cable connections are provided so that 49a, the brass plate section retaining one end of the wire first to be cut, is electrically connected to a plug which may be inserted in receptacle 36 of Figure 2, while the integral brass plate 49 and the section 49b are each provided with two cable connections which terminate in a polarized four-way plug, the latter being adapted for insertion in plug receptacle 37 of Figure 2, so that plate 49 may be electrically connected with contacts 37a and 37b and plate section 49b with points 37c and 37d of Figure 2.

By the provision of a sufficient number of notches in the two sets, it is possible to interrupt successively the conductors corresponding to 5 and 6 of Figure 2 with the intervention of any of a series of known time intervals. It has been found convenient in one embodiment of this apparatus to provide two sets containing thirty-four notches each, placed so that the distance between wires, fastened in successive sets of notches, measured along the arc of the circle described by the mid-point of the revolving cutting edge 45, amounts to 0.125 inch. Sixty-seven different distances are provided by this arrangement, the longest and shortest distances available being 11.250 and 3.000 inches respectively; with the knife rotating at 1800 R. P. M., these limiting distances correspond respectively to intervals of 5.00 and 1.33 milliseconds. If a calibration is desired for projectile velocity measurements over a distance of 4.0 feet, these intervals correspond respectively to velocities of 800 and 3,000 feet per second. Sixty-seven known time intervals or velocity values are thus provided for use in calibration. Longer or shorter intervals than the above extreme values may be provided as desired by increasing the number of notches or changing the speed of revolution of the motor or altering the length of the blade 40.

In operation, lengths of bare copper wire about 0.006 inch in diameter are fastened tightly across the two desired sets of notches. The rack 42 is swung into position over the slit in the table top so that its free end rests on spring 43, which maintains the wires just out of the path of cutter 45. The motor is started and allowed to attain its full speed. When the existence of a steady state is indicated by the frequency meter 44, the end of the rack is rapidly pressed down, resulting in the desired cutting of the wires. An occasional abnormal reading is obtained whenever the cutter 45 happens to be at a position between the two wires at the instant the rack is pressed down into operating position. The chance of this occurrence is, however, slight and becomes immediately noticeable since it results in the total discharge of the condenser through the galvanometer and therefore an unusually rapid galvanometer deflection, which can always be stopped immediately by releasing switch 34 into the damping position.

The frequency meter 44 may be of any suitable type, such as that provided with reeds which vibrate in resonance with the line frequency, having an absolute accuracy within ±0.2%. The meter reading at the instant at which the wires are cut is used to correct the rate of revolution of blade 40 to the actual value, which is readily calculable since the motor speed is directly proportional to the existing line frequency.

The simplicity and reliability of this type of calibrating device enables the rapid standardization and checking of the time-measuring apparatus. The checking may be accomplished by the measurement of two different time intervals once or twice daily. An important feature is that it permits the direct calibration and standardization of the identical measuring circuit utilized in the measurement of unknown time intervals.

The preferred circuit and calibrating device described above, enable the accurate and direct determination of time intervals within the ranges 0.1 to 8 milliseconds and 0.33 to 10 milliseconds, corresponding to settings a and b respectively of switches 11, 12, 13, and 14. A typical calibration procedure for the latter range of time intervals is given below.

Wires are fastened across the desired two sets of notches in the time-wire rack and are connected with the control panel by insertion of the plugs in receptacles 36 and 37. Switches 11, 12, 13, and 14 are set at the b position and a period of 15–60 minutes allowed to elapse to permit the battery 10 to reach a steady state. With switch 33 attached at 33a, switch 34 in the damping position (closed), and switch 35 attached at 35a, the zero reading of the light beam on the galvanometer scale is noted. Switch 33 is then connected with 33b and switch 34 opened, whereupon a galvanometer deflection is obtained corresponding to the potential drop across the condenser 3. This potential drop may then be adjusted to a desired value, for example, to cause a galvanometer deflection of exactly 780 mm. on the scale, by appropriate manipulation of the coarse and fine adjustment knobs 29 and 30 respectively. This procedure may be repeated occasionally during a series of measurements to insure constancy of the operating conditions of the apparatus. Switch 33 is then returned to the 33a position, whereupon the galvanometer coil revolves toward its zero position, the damping switch 34 being closed when the light beam is close to the zero mark, in order to prevent the coil from passing its zero position.

Switch 35 is then transferred to the 35b position and switch 34 is opened. The operator of the calibration apparatus then lowers the timer-wire rack and when the frequency indicator gives a steady reading, presses it down into operating position, thereby causing wires 5 and 6 to be cut. The galvanometer beam immediately starts its deflection, goes to a maximum, and returns to zero. The control operator notes the maximum reading, then immediately transfers switch 35 to position 35a, and releases switch 34 to the damping position when the galvanometer light beam is closely approaching its zero position. As soon as switch 35 has been changed from the b to the a setting, the operator at the timer-wire apparatus is free to proceed with the attachment of wires for the next reading. Furthermore, with the 35a connections closed, the condenser is being charged in preparation for the next reading during the time required for the return of the galvanometer coil to its zero position. It has been found that a minimum period of twenty seconds is required after the application of a given potential drop across the condenser for the attainment of the equilibrium electrical charge on the same; the provision of switch 35 enables the utilization of the period required for the return of the galvanometer coil to its zero position for charging the condenser and also for the placing of the timer-wires for the next determination. A similar lag has been observed to exist in obtaining the complete discharge of the condenser and the maintenance of the connections between the condenser and the galvanometer (i. e. switch 35 in the b position) until just after the obtainment of the maximum deflection has been found suitable and desirable for attaining reproducible discharge of the condenser. The lag which occurs in obtaining the complete charge and discharge of the condenser has been ascribed to a condition of hysteresis in the dielectric, called "dielectric viscosity."

The above procedure is repeated a number of times, for example, five times, for a given setting of the calibration wires. The probable percentage error of an individual reading with the described arrangement for a time interval of the order of 0.004 second is within the range of 0.1 to 0.5 percent, while the probable percentage error of the average of five observations is within the range of 0.05 to 0.20 percent. A complete calibration curve is obtained by the use of other time intervals provided by the calibration device. A typical set of observations, illustrated in Figure 7, were obtained with $C=1\times10^{-6}$ farad, E (potential across condenser) corresponding to 780 mm. on the galvanometer scale, and $R=800$ and 1600 ohms, respectively. Values read from the curves are listed in Table I.

Table I

| Galvanometer scale reading, mm. | Time | |
|---|---|---|
| | R=800 ohms | R=1600 ohms |
| | Milliseconds | Milliseconds |
| 200 | 3.06 | |
| 300 | 2.44 | 4.89 |
| 400 | 2.09 | 4.20 |
| 500 | 1.85 | 3.73 |
| 600 | 1.68 | 3.38 |
| 700 | 1.54 | 3.09 |
| 800 | 1.41 | 2.83 |
| 900 | | 2.59 |

In practice, only a single calibration curve is required for one set of values of E, C, and R. Calibration curves for other resistances can then be calculated, as corroborated by the experimental data in Table I, which show that for a given scale reading, the time obtained with a resistance of 1600 ohms is twice that obtained with a resistance of 800 ohms. By the additional provision of 200, 400, and 3200 ohm resistances, the given setting of E and C may be used in conjunction with a single calibration curve for the determination of time intervals ranging from 0.33 to 10.0 milliseconds. The calibration may thus be extended beyond the range of known time intervals which can be produced by means of the calibration apparatus. The established calibration curve remains standard and several points may be checked whenever desired, to insure accuracy. If the constants of the circuit undergo any slight gradual change on ageing, as may, for example, occur in the capacity of the condenser, compensation may be made by a slight change in E, such that the galvanometer scale readings obtained for given time intervals correspond with the basic calibration curve. For convenience in operation, the galvanometer scale, which ordinarily reads in millimeters, may be supplemented or substituted by a scale giving the readings directly in terms of absolute time values for one particular setting of E, C, and R. When a different value of R is used, the scale reading is multiplied by the proper factor which for convenience may be engraved on the control panel so as to be indicated by the pointer of the switch.

Figure 7:
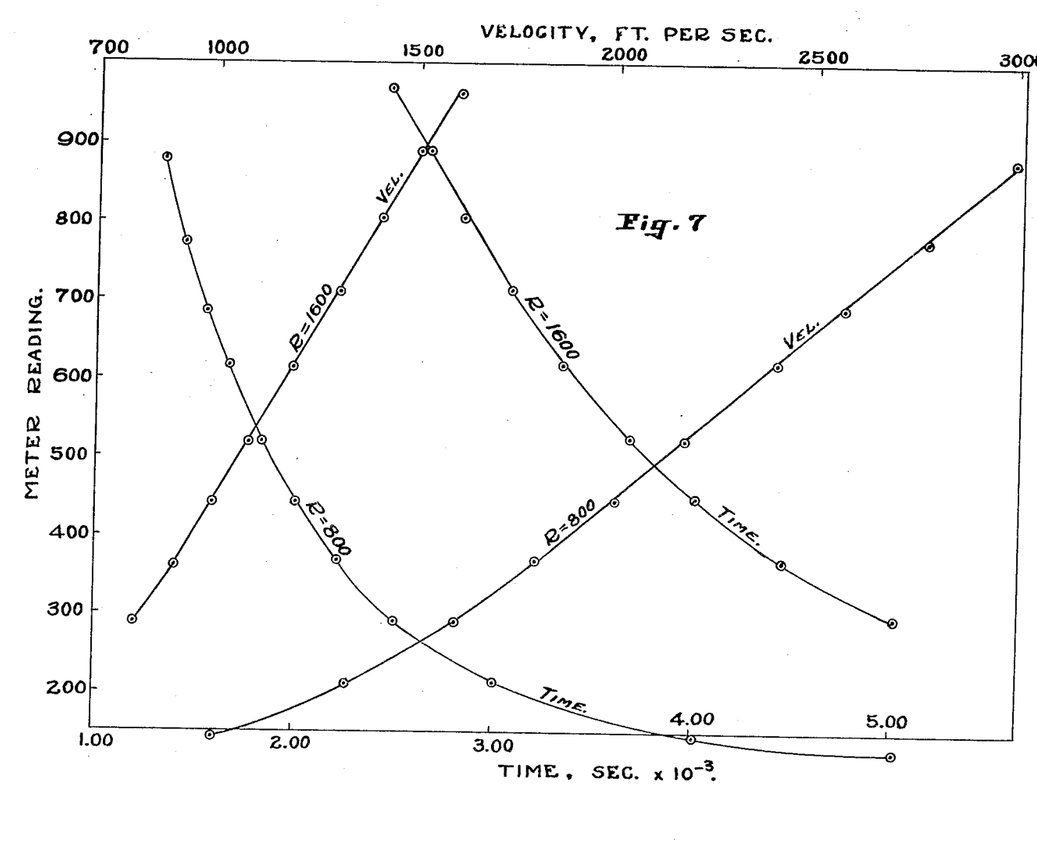
Figure 7 is a set of typical calibration curves for the direct determination of time intervals and of projectile velocities.

The data given above may likewise serve to calibrate the galvanometer scale readings directly in terms of velocity measured over any desired distance, for example four feet, by a simple calculation; i. e. four feet divided by the time in seconds required for traversing this distance gives the corresponding velocity in feet per second. Velocity calibration curves based on the above data are illustrated in Figure 7 and listed in Table II.

Table II

| Galvanometer scale reading, mm. | Velocity, feet/sec. (s=4.0 ft.) | |
|---|---|---|
| | R=800 ohms | R=1600 ohms |
| 200 | 1310 | |
| 300 | 1640 | 820 |
| 400 | 1995 | 950 |
| 500 | 2150 | 1070 |
| 600 | 2380 | 1185 |
| 700 | 2595 | 1295 |
| 800 | 2835 | 1415 |
| 900 | | 1540 |

The galvanometer calibration values in terms of velocity offer the additional advantage as mentioned previously of being substantially linear over a considerable range, and therefore only two values within this range are required to establish the calibration between the limits of linearity. As indicated above, a calibration obtained for given values of R, C, E and s can be extended by simple calculation to include other values of R and s. The features of flexibility permit any given velocity to be measured at a setting such that the galvanometer deflection obtained will lie on a linear portion of a calibration curve. As in the case of direct time measurements, an appropriate scale may be provided for obtaining velocity readings directly from the galvanometer deflections.

An arrangement of apparatus which has been found convenient for the utilization of a chronoscope of the above type for the measurement of the muzzle velocity simultaneously with other ballistic properties of small arms ammunition, including shot shells and loaded rifle cartridges, is described in the following, and is illustrated in the accompanying drawings. A distance of 4.0 feet has been found suitable for s, the distance between the timer-wires, and corresponds to the distance between 5 and 6 of Figure 8 which is a plan view of the timer-wire apparatus. Numeral 55 represents a three-inch diameter pipe which is rigidly fastened to framework 56 by means of straps 57. Timer-wires 5 and 6 are attached across two pairs of well insulated notched brass plates about three inches apart, 58a and 58b and 58c and 58d respectively, by means of binding posts 59, a side view of the arrangement being shown in Figure 9. Plates 58 are provided with a vertically projecting edge having a notch 60 and are securely fastened to framework 56 by means of insulating rods 61. One of each pair of plates is conveniently arranged to retain a spool of the timer-wire, for which bare copper wire, about 0.006 inch in diameter, has been found suitable. Permanent electric cable connections are provided so that 58a terminates in a single plug connection adapted for insertion in receptacle 36 of Figure 2, while two wires attached to 58b and two wires attached to 58c terminate in a polarized four-way plug adapted for insertion in receptacle 37 of Figure 2 so as to make contact with points 37a, b, c, and d respectively; plates 58b and 58d are permanently connected by a suitable conducting cable.

Figures 8, 9, 10:
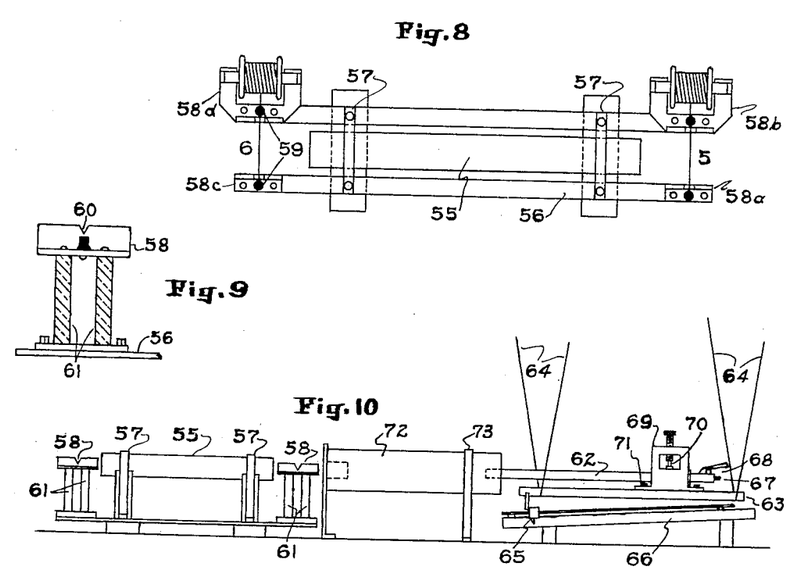
Figure 8 is a plan view of a preferred arrangement of apparatus for holding spaced timer-wires to be severed by a projectile in a velocity determination.
Figure 9 is a side elevation showing the detailed construction of the timer-wire holder of the apparatus shown in Figure 8.
Figure 10 is a side elevation of a preferred arrangement of apparatus for the obtainment of muzzle velocity, pressure, and recoil of small arms ammunition.

A side elevation of an assembly suitable for the measurement of muzzle velocity, pressure, and recoil of shot shells is shown in Figure 10. The shotgun 62 is mounted on a suitable section of seven-inch channel iron 63, which is suspended by means of six steel wires 64 so as to constitute a pendulum approximately twelve feet in length. The amount of recoil is indicated by the displacement of the pointer 65 caused by a projecting finger attached to section 63, along the scale 66. A suitable arrangement 67 is provided for loading the gun and a suitable trigger assembly for firing the shot is indicated at 68. An attachment 69, of usual construction is provided for the measurement of the maximum pressure developed in the gun by means of the deformation of a metal cylinder 70. Other means for measuring pressures may be used if desired; for example, cylinder 70 may be replaced by a piezo-electric element operated in conjunction with a cathode ray oscillograph to obtain a complete pressure-time curve. The gun is securely mounted on a base plate 71, to which the breech mechanism is likewise fastened. A four-foot section of iron pipe 72 is interposed between the gun 62 and the timer-wire set-up for the purpose of removing and collecting the top wads of shot shell loads, since it has been found that without the provision of such a space between the gun muzzle and the first timer-wire 5, the latter was frequently broken prematurely by the said top wad, resulting in a decreased velocity reading. The described arrangement completely obviates the possibility of such occurrences. The ends of pipe 72 are closed by means of one-quarter inch boiler plate, excepting for a 1½ inch diameter opening at the gun muzzle end and a 1¾ inch diameter opening at the opposite end, which it has been found convenient to extend inwardly for a few inches by means of suitable pipe. Strap 73 is provided for securely fastening pipe 72. A slot extends along the bottom of the pipe 72 to enable the ready removal of the wads.

In operation, timer-wires 5 and 6 are fastened in position and a round of the ammunition being tested is loaded in the gun, which previously had been accurately aligned with the center-points of wires 5 and 6. A metal cylinder 70, usually of lead, is inserted in position in the pressure yoke assembly 69. The signal to proceed with the firing of the shot is given by the operator at the control panel who in the meantime has completed the accurate adjustment of the potential drop across condenser 3 and has set switches 11, 12, 13, and 14 and resistance 2 at the positions best suited for the particular velocity to be determined, switch 33 at the a and 35 at the b position, and switch 34 in the open position. The shot is fired by the gun operator, who may then note the amount of recoil and the compression of cylinder 70, and prepare the gun for the next shot. The maximum deflection of the galvanometer light beam is noted by the control panel operator, who then returns switch 35 to the a position, whereupon the timer-wires 5 and 6 may be adjusted for the next shot. This operation consists simply in drawing a suitable length of wire from the spool and fastening tautly across the binding posts 59. The control panel operator stops the swing of the galvanometer coil near its zero position by closing switch 34, then reopens it and sets switch 35 at the b position, the measuring apparatus being thus placed in readiness for the next shot. With three operators, one at the control panel, one at the gun, and one at the timer-wires, it has been found feasible to obtain measurements at the rate of two shots per minute.

Suitable automatic signal lights may be provided to increase the safety and facility of operation. Thus, a red light may be furnished at the timer-wire apparatus and a green light at the gun, the light circuits being operated by switches which are mechanically connected with switches 34 and 35. Arrangements may conveniently be such that when the control switches are placed in readiness for a velocity reading, both lights are on, the green light indicating to the gun operator that the shot may be fired and the red light warning the timer-wire operator to stay clear of the apparatus. With switch 35 in the a position, both lights are out, indicating that the galvanometer and condenser are disconnected from the timer equipment, and therefore that the timer-wires may be adjusted and that the gun should not be fired.

Muzzle velocity measurements, obtained with the above apparatus at two-week intervals, on a carefully prepared standard lot of 12 gauge shot shells, loaded with 3¼ dram equivalents of smokeless powder and 1⅛ ounces of shot are listed in Table III, each value representing the average of at least five shots.

Table III

| Average velocity (feet per second) | Percentage probable error of average velocity |
|---|---|
| 1347 | 0.56 |
| 1347 | 0.28 |
| 1345 | 0.57 |
| 1361 | 0.28 |
| 1348 | 0.39 |
| 1358 | 0.27 |
| 1352 | 0.41 |
| 1346 | 0.40 |

Muzzle velocities obtained with other types of shot shells are listed in Table IV.

Table IV

| Shot shell | | | Number of shots | Average muzzle velocity | Percentage probable error of average velocity |
|---|---|---|---|---|---|
| Gauge | Powder charge | Weight of shot | | | |
| | Grains | Ounces | | | |
| 16 | 18.4 | 1 | 10 | 1160 | 0.24 |
| 20 | 15.9 | ⅞ | 10 | 1140 | 0.39 |
| 28 | 19.5 | ¾ | 10 | 1268 | 0.24 |
| 410 | 16.8 | ⅝ | 10 | 1093 | 0.41 |

Figure 11:
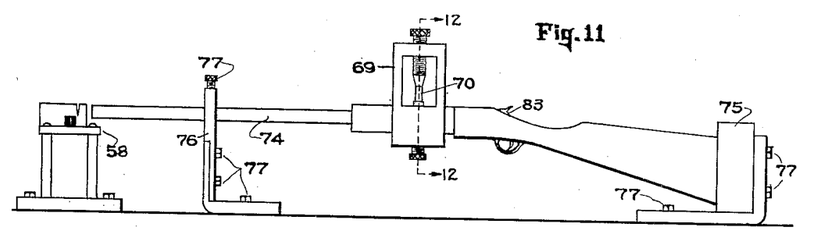
Fig. 11 is a side elevation of a rifle mounted for the obtainment of projectile velocity measurements.

For the obtainment of muzzle velocities of loaded rifle cartridges, a rifle may be substituted for the shotgun 62 in the above apparatus. It has been found convenient to mount the rifle by means of two adjustable clamps, one at the butt end and the other at a point along the rifle barrel, securely retaining the same, in alignment with the timer-wires. The four foot spacing between the two timer-wires is suitable and for small caliber rifle bullets, the length of the wires to be broken may be shortened to about one inch. Suitable apparatus, which in itself forms no part of the invention, is illustrated in Fig. 11, rifle 74 being secured in the desired position by tightening screws 77 of clamps 75 and 76. Typical results are listed in Table V.

Table V

| Type | No. of shots | Average velocity | Percentage probable error of average velocity |
|---|---|---|---|
| | | Feet per second | |
| 22 long rifle regular | 25 | 1118 | 0.23 |
| Do | 25 | 1090 | 0.20 |
| Do | 25 | 1094 | 0.27 |
| Do | 25 | 1109 | 0.33 |
| Do | 25 | 1087 | 0.26 |
| 22 long rifle (high speed) | 25 | 1341 | 0.29 |
| 220 swift | 10 | 4141 | 0.18 |

Figure 12:
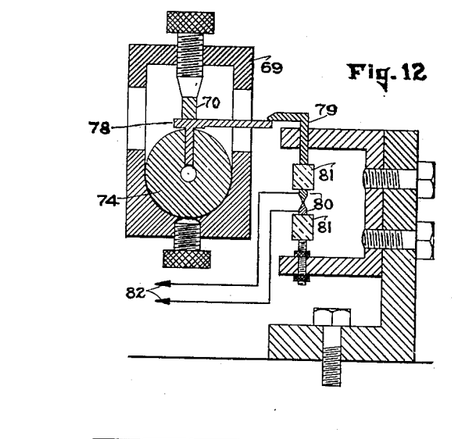
Fig. 12 is a transverse sectional view along line 12—12 of Fig. 11, illustrating apparatus suitable for use in obtaining ballistic measurements on ammunition.
Figure 13:
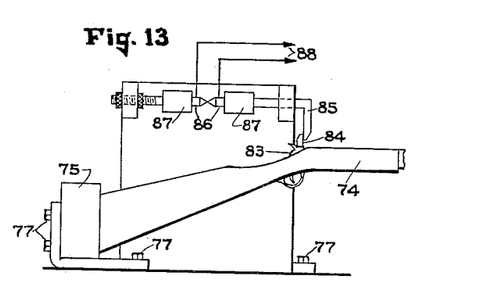
Fig. 13 is a side elevation illustrating apparatus suitable for use in obtaining ballistic measurements on ammunition.

The chronoscopic method and apparatus of this invention have also been applied to the measurement of the ignition time and barrel time of small arms ammunition. For these measurements, the test firearm is equipped with auxiliary fittings, not of themselves forming part of the invention, as follows: a timer-wire-holder 58, shown in Fig. 11, near the muzzle, which may be similar in construction to the assembly illustrated in Figure 9, but which preferably has the wire notch placed close to the muzzle; an electrical circuit adapted to be opened by the upward movement of the pressure piston of a "crusher gauge" pressure assembly similar to 69 of Figure X, shown in Fig. 12 in transverse sectional view taken along line 12—12 of Fig. 11; and an electrical circuit mechanically operated with the firing pin so as to be opened at the instant the latter strikes the shell after release of the trigger, illustrated in Fig. 13. Referring to Fig. 12, upward movement of pressure piston 78 will raise movable metal rod 79 and break the contact between points 80, which are mounted on insulators 81, thus opening the circuit attached to lead 82. Referring to Fig. 13, when rifle 74 is fired, metal part 84 is actuated with the firing-pin by the motion of hammer 83, moving metal rod 85 and breaking the contact between points 86, mounted on insulators 87, thus opening the circuit attached to lead 88. By means of these circuits, the following intervals may be measured independently: (1) Ignition time, defined as the time elapsing between the striking of the firing pin and the initial movement of the pressure piston, (2) Barrel time, defined as the interval elapsing between the first movement of the pressure piston and the emergence of the projectile from the muzzle of the firearm, and (3) the sum of these two intervals. These measurements are made by substituting for conductors 5 and 6 of Figure 2, respectively: (1) the firing pin circuit and the pressure piston circuit, (2) the pressure piston circuit and the muzzle timer-wire, and (3) the firing-pin circuit and the muzzle timer-wire. In a series of such measurements on long rifle 22 calibre ammunition, it was found that the ignition time varied according to the type and amount of primer used from 0.23 to 1.23 milliseconds, while the barrel times with ammunition ranging in muzzle velocity from 1070 to 1390 feet per second varied from 2.16 to 1.54 milliseconds.

Figure 14:
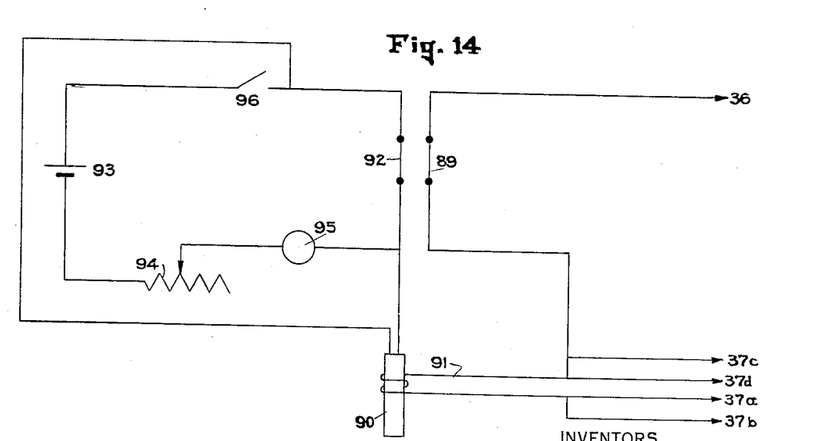
Fig. 14 is a diagrammatic view of an electrical circuit suitable for the measurement of the firing time of electric detonators.

A further application of the chronoscopic method and apparatus of this invention has consisted in the determination of the firing time of electric detonators for various firing currents. For this measurement a conductor corresponding to 5 of Figure 2 was broken simultaneously with the application of the current through the ignition wire of the detonator and a conductor corresponding to 6 was broken by the explosion of the detonator, the intervening time being measured by the galvanometer deflection produced; for this series, the a setting of switches 11, 12, 13, and 14 was convenient. A suitable arrangement, in itself forming no part of this invention, is shown in Fig. 14, in which conductors 89 and 91 correspond respectively to conductors 5 and 6 of Fig. 2. A suitable method, merely illustrative and in itself forming no part of this invention, of making a measurement consisted in providing a firing circuit for the detonator 90 consisting of battery 93, rheostat 94, ammeter 95, and switch 96, then shunting this circuit by means of conducting wire 92, and placing the latter adjacent conductor 89, connected as shown. In making a measurement, switch 96 was closed and conductors 89 and 92 were severed by means of a high velocity bullet. Typical results obtained with No. 6 electric detonators are listed in Table VI.

Table VI

| Firing current | Firing time |
|---|---|
| Amperes | Milliseconds |
| 1.25 | 7.3 |
| 1.50 | 5.5 |
| 1.75 | 4.65 |
| 2.15 | 3.7 |

The principles of this invention may be applied to the accurate and direct measurement of the duration of phenomena whenever the initial and terminal points can each readily be made coincident with the interruption of a conductor attached in a suitable electrical circuit. The interruption may consist in the severing of a suitable conducting wire or the opening of an electrical contact, but should preferably not involve appreciable mechanical resistance such that errors are introduced in the time measurement.

With particular reference to the testing of small arms ammunition, this invention provides simple and rapid means for the direct and accurate measurement of projectile velocities, either over short or extended portions of the trajectory, which may be utilized simultaneously with the determination of other ballistic properties. Velocities may be obtained directly, without involving any of the tedious calculations, photographic recordings, or measurements of distances between recorded marks such as have been essential in prior methods of measurement.

Since the method and apparatus hereinbefore described are applicable to various fields of use and the specific disclosures are subject to modifications which will be evident to those skilled in the art, and furthermore, since features of novelty presented may likewise be of utility in related methods and apparatus, it is to be understood that the invention is not limited to the details of the methods and apparatus herein disclosed, but that such modifications and the use of such individual features and subcombinations of features as do not depart from the spirit of this invention are, although not specifically described herein, contemplated by and within the scope of the appended claims.

What we claim is:

1. Apparatus for indicating the duration of a phenomenon comprising a complete electrical circuit composed of a condenser, an electrical charge measuring instrument, and a resistance connected in series and a source of electromotive force attached across the resistance to charge the condenser, means for short-circuiting the condenser through the resistance from the start of the phenomenon, and means coincident with the termination of the phenomenon for passing the residual charge of the condenser through the said instrument.

2. Electrical time-measuring apparatus comprising as calibration means a pair of fragile conductors, an insulated cutting blade, a synchronous motor for driving the said blade, and means for supporting the said conductors in spaced relation and being movable for placing them in the path of the said blade.

3. Apparatus for velocity measurements comprising a complete electrical circuit composed of a source of electromotive force, a resistance, and a fragile conductor connected in series, an auxiliary circuit composed of a condenser and a second fragile conductor attached in series across the terminals of the said resistance, and an electrical charge measuring instrument connected in parallel to the said second conductor, and means for mounting the said conductors in spaced relation along a trajectory.

4. Apparatus as set forth in claim 3, having the elements such that the instrumental deflections vary linearly with the velocity, being proportional to $$CEe^{-2}\left(\frac{4RC}{s}v-1\right)$$

5. Electrical time-measuring apparatus comprising as calibration means a pair of fragile conductors, an insulated cutting blade, a rotor for driving the said blade, means for measuring the rate of rotation of the rotor, and means for supporting the said conductors in spaced relation and being movable for placing them in the path of the said blade.

6. Apparatus for the measurement of time intervals comprising a complete electrical circuit composed of a battery, a resistance, and a fragile conductor connected in series, an auxiliary circuit composed of a condenser and a second fragile conductor attached in series across the terminals of the said resistance, and a ballistic galvanometer connected in parallel to the said second conductor.

7. Apparatus as set forth in claim 1, the said condenser being maintained at constant temperature.

8. Apparatus as set forth in claim 1, the said resistance being one of a series of interchangeable resistances having values in the ratio of simple whole numbers.

ROBERT L. WOMER.
EDWIN F. FLORMAN.